United States Patent Office 3,566,580
Patented Mar. 2, 1971

3,566,580
MEMBRANE SEPARATION
Norman N. Li, Edison, N.J., assignor to Esso Research and Engineering Company
No Drawing. Filed Nov. 27, 1968, Ser. No. 779,650
Int. Cl. B01d 59/12
U.S. Cl. 55—16
15 Claims

ABSTRACT OF THE DISCLOSURE

The separation of mixtures; in which the various elements have different degrees of solubility in a liquid is enhanced by cocurrently permeating vapor from said liquid and the mixture through a semi-permeable membrane; the membrane must have an attraction for said liquid.

FIELD OF THE INVENTION

This invention relates to the separation of the various components of a gaseous mixture, said components having different degrees of solubility in a liquid. More particularly, this invention relates to the separation of the components of a gaseous mixture by permeation through a semi-permeable membrane, said permeation taking place in the presence of a vaporous liquid in which the elements of the mixture have different degrees of solubility. The semi-permeable membrane utilized must have an attraction for said liquid. In a more preferred embodiment the mixture to be separated comprises gaseous hydrocarbons; the preferred liquid to be utilized is water.

PRIOR ART

The separation of various elements of a mixture of gases by means of differential diffusion through a semi-permeable membrane is well known in the art. The effectiveness of these separations has, however, been quite frequently limited because of the low membrane selectivity, or the similar permeation rates of the various components of the mixture. Thus, while attempting to separate an olefin such as ethylene from a paraffin such as methane difficulty was encountered because the permeation rates were quite similar. The similarity in permeation rate required the use of many stages of separation in order to bring about a truly effective separation of the elements. Another example of similar permeation rates is found when separating hydrogen from carbon dioxide when using a cellulose acetate membrane. The separation factor, defined as the ratio of the concentration of more permeable compound to the concentration of less permeable compound in the product, to the ratio of the the two in the raffinate, in a single stage, is 1.06. This means that starting with a 50 wt. percent mixture of each a single stage operation will produce a product having a ratio of 51.5 $H_2$/48.5 $CO_2$. In order to get a product of 99% purity, multistage operation of about 80 stages are needed in the process. This topic is discussed in S. B. Tuwiner, "Diffusion and Membrane Technology" Reinhold, New York (1962) herein incorporated by reference.

In a recent U.S. Pat. 3,335,545, an attempt was made to utilize differences in solubility to enhance the separation obtained when diffusing a mixture through a polymeric membrane. This was accomplished by maintaining a thin stationary liquid-film on top of the membrane. The mixture to be separated was then passed downflow through this liquid-film wherein certain elements of the mixture were less soluble. The more soluble elements pass through the film of liquid more rapidly; the less soluble elements of the mixture are impeded by the liquid and consequently, their permeation rate through the combined films is considerably reduced.

Although this invention was successful in enhancing the separation of the more soluble from the less soluble elements of a mixture the permeation rate of the various more soluble elements was slow, because in addition to the membrane, the various elements to be separated must pass through the liquid layer.

SUMMARY OF THE INVENTION

According to this invention it has unexpectedly been discovered that the membrane selectivity for particular elements in a mixture may be enhanced if cocurrently with the permeation of the mixture through a semipermeable membrane a vaporous liquid is passed through the membrane. The elements of the mixture must have different degrees of solubility in the vaporized liquid and the membrane must possess an attraction for the liquid. In this manner the selectivity and the permeation rate for the more soluble elements are improved. By attraction it is meant that the membrane has the capacity to imbibe the liquid.

This invention is best exemplified by the separation of gaseous mixtures the separate elements of which have differing degrees of solubility in water. Water vapor is cocurrently permeated through the membrane with the mixture; in which case the membrane should preferably be hydrophilic in nature. The resulting product is enriched in the more water soluble elements to a substantially greater extent than if no water is present. It should be emphasized that although the invention will be herein described in terms of the use of watervapor, other liquids such has $C_1$-$C_4$ alcohols may be effectively utilized. In the case of an alcohol a hydrophilic membrane is most satisfactory since hydrophilic membranes will also have an attraction for alcohol. A typical separation with an alcohol vapor carrier is that of hexene from a mixture with hexane. Other liquids which may be used with the proper membrane are ethylene glycol, dimethyl ethers of ethylene glycol and various derivatives thereof.

In the case of water, as mentioned above, a hydrophilic membrane is most desirable. By hydrophilic, it is meant that a membrane should have the following characteristics: The permeability of the membrane to water should be equal to or greater than 100 as calculated by the Fick's equation in which the results are expressed in terms of cubic centimeters times millimeters per second, per square centimeter per centimeters of mercury. The formula for Fick's law is:

$$J = P\left(\frac{p_1 - p_2}{L}\right)$$

where:

J=permeation rate, cc. @ S.T.P./cm.$^2$ sec.
p=pressure in cm. Hg. Subscripts 1 and 2 refer to upstream and downstream of the membrane respectively
L=membrane thickness, in mm.
P=permeability The mixture should contain at least 0.002 wt. percent of water, preferably the mixture should contain 1–10 wt. percent of water and in the most preferred form of the invention the mixture should be saturated with water at the temperature of operation.

In a preferred embodiment of the instant invention the gaseous mixture, the elements of which are to be separated, is commingled with the water by bubbling the gaseous mixture directly through the liquid, water. This bubbling serves to bring the gas into extremely intimate contact with the liquid. When the gas contains at least about 1 wt. percent of water it is then contacted with the hydrophilic membrane. The membrane selectivity for the more soluble element of the mixture is found to increase greatly, it may be increased by a factor of 2 to 5. Atomization of the water into the mixture may be utilized but this tends to be a more difficult procedure.

Temperatures are critical to the extent that the water must be in the vapor phase while permeating the membrane; elevated temperatures maintained throughout the saturation and separation zones will produce a high content of water vapor in the feed gas stream. Pressure is not critical but should not be sufficient to liquify the water vapor. A pressure differential must, of course, be maintained between the two sides or faces of the hydrophilic membrane in order to facilitate permeation.

More particularly, this invention may be used to separate components of substantially all gaseous mixtures, since the various components of a mixture will ordinarily have different degrees of solubility in liquids such as water, although in some instances the difference in solubility is extremely slight. The invention will find greatest utility for those separations wherein the difference in solubility between the various elements of a mixture is more pronounced.

Specifically, the invention may be utilized to separate components of any gaseous mixture such as ammonia from nitrogen and hydrogen. In the synthesis of ammonia, the ammonia produced in the reactor has to be recovered from the mixture with the unreacted gases, namely, nitrogen and hydrogen. Usually the ammonia concentration in the mixture is low, about 10–20 percent. This presents an ideal condition for membrane separation because of the low volume of ammonia gas which must be separated from nitrogen and hydrogen.

Another instance where this invention may be utilized with particular effectiveness is the separation of carbon dioxide from hydrogen and from oxygen. The separations in both cases will be enhanced greatly by using water vapor as a carrier gas because of the large difference in the solubility of the elements of the mixture in water. The solubility ratios of carbon dioxide to hydrogen and to oxygen are large, i.e. 945 and 37 respectively at 25° C. The former separation is important in petroleum industry. The latter is important in many technological areas and is a necessary operation in maintaining a life-supporting environment in a space ship.

The most preferred separation is that of hydrocarbon mixtures. Examples of such separations include the separation of olefins from paraffins, aromatics from paraffins, olefins from aromatics, paraffins from one another, olefins from one another, aromatics from one another, branched-chain hydrocarbons from straight-chain hydrocarbons, oxygenated hydrocarbons such as alcohols, ketones, ethers, aldehydes, acids, etc. from one another. Other separations would include the separation of alcohols, recovery of amines from a gaseous mixture, etc. and the separation of hydrocarbon gases from inorganic gases, such as methane from helium as in the separation of various components of natural gas.

Hydrophilic membranes, as defined above, are relatively numerous. Examples of the common hydrophilic membranes are cellulose acetate, ethyl cellulose and methyl cellulose, polyamides having the trade name nylon, and polyethylene glycol terephthalate known as Mylar in the trade. Examples of less commonly known hydrophilic membranes are agar, which is a galactoglycan with occasional sulfate ester (—OSO$_3$H) groups; carboxymethyl cellulose, which is a carboxymethyl ether (—OCH$_2$COOH)

of cellulose, maize starch, which has three hydroxyl groups (—OH) per monomer unit, and gelatin, which consists of different amino acids, some of which may have polar and some nonpolar side chains, linked successively by peptide bonds.

The gaseous mixture to be separated can be maintained at a variety of temperatures ranging from just above freezing to elevated. It is, however, preferred to maintain the temperature above ambient, i.e. 75–160° F., the higher the temperature, the greater the amount of water vapor in the gas stream. The limit of the amount of water vapor, and hence the temperature used; is dictated by the economics of the process, since too high a temperature will produce too much water vapor, resulting in over-dilution of the feed gases.

Following the addition of water to the mixture it is then passed into a separation zone wherein the water-containing mixture is contacted with the hydrophilic membrane. The permeation of the more water soluble element is encouraged and a mixture is recovered enriched in the more water soluble element, relative to the original mixture.

Temperature within the separation zone should be maintained equal to or slightly higher than the temperature of the zone where the water is added to the gas.

The rejected elements of the mixture may then be re-contacted with water and again contacted with the hydrophilic membrane. This additional contacting may be accomplished by recycle of the raffinate or alternatively, the rejected product may be subjected to permeation with an additional series of hydrophilic membranes.

The saturation zone may, in a preferred embodiment, consist of a column containing water. The column should have a heating device for controlling the temperature of the water, and should be long enough to provide sufficient contacting time of gas in water so that when the gas stream leaves the column, it is either saturated with water vapor or alternatively, contains the desired level of water vapor.

The separation zone is a membrane unit with a heating device to maintain its temperature equal to or slightly higher than the temperature of the incoming gas stream for preventing condensation of water vapor in the lines or unit. In order to maintain a constant feed gas composition in the upstream side of the membrane, a part of the gas on the upstream side of the membrane is constantly drawn off as the raffinate stream. It can, as mentioned previously, be recycled for further separation.

In a further preferred embodiment of this invention a feed stream which is a gaseous mixture of methane and ethylene is introduced into a saturation zone. The zone contains a column filled with water to about ⅔ of its height, the feed stream is passed into the zone at the rate of about 60 cc. (S.T.P.)/minute, the components of the feed stream are present in equal weight concentrations. A heating element is maintained within the zone which serves to keep the temperature of the zone at 75 to 160° F. Pressures within the zone are 100 to 200 p.s.i.g. The gaseous mixture removed from the zone is substantially saturated with water; the saturated mixture is then passed into a separation zone containing a hydrophilic membrane; Mylar. A swelling is observed in the membrane which is attributable to the presence of water within the mixture. Product obtained from the permeation of the mixture is analyzed as having 74% to 77% of the more permeable element, which is ethylene, and 26 to 23% of the less permeable element, which is methane. A raffinate stream is recovered separately and this contains 40 to 45% of the more permeable compound and 55 to 60% of less permeable compound. The raffinate is then saturated with water in the above described manner and recycled back through the separation zone.

SPECIFIC EXAMPLES

In all of the following examples an olefin, ethylene, was separated from a paraffin, methane.

Example 1

A mixture comprising 50% by weight of ethylene and 50% by weight of methane, in the gaseous state, was continuously introduced into a saturation zone. Within the zone was water in the amount of 1130 gm. in a 6 cm. diameter column, the pressure in the zone was 100 p.s.i.g., temperature was 25° C. The mixture was introduced into the zone at a velocity of about 60 cc. (S.T.P.)/ minute. The gas removed from the column was saturated with water vapor at the operating temperature of 25° C.; it was determined that the mixture was saturated by means of condensation test, namely, a gas sample was taken and chilled to 0° C. to condense the water vapor contained in the sample. The condensed water was then weighed and compared with the predicted amount of water presented in a saturated gas stream.

The saturated mixture was then continuously introduced into a separation zone, which contained a hydrophilic membrane at a rate of about 65 cc. (S.T.P.)/ minute. The particular hydrophilic membrane was Mylar, which is the commercial name of polyethylene glycol terephthalate. Temperature in the separation zone was 25° C. and pressures were 100 p.s.i.g. The Mylar used had a density of 1.39 gm./cc. The product was constantly withdrawn from the opposite face of the membrane. Analysis of the product by gas chromatography indicated that it contained 75.5% ethylene and 24.5% methane. A raffinate which contained 45% ethylene and 55% methane was recovered from the upstream side of the membrane. This raffinate was then resaturated with water by combining it with the incoming feed gas stream to the saturation zone, and recycled back into the separation zone.

Example 2

In this example the exact conditions of the preceding example were utilized except that the mixture of methane and ethylene was passed directly into the separation zone without contacting the saturation zone, no water was added. Permeation through the membrane produced a product having the following composition: 54.5% ethylene and 45.5% methane.

From the above it is readily apparent that the presence of the water vapor serves as an effective carrier for the more soluble element of the mixture.

Example 3

In this example the conditions of Example 1 were repeated except that a different hydrophilic membrane was utilized. In this example the membrane was cellulose acetate with a density of 0.2362 gm./cc. The results achieved were as follows: the product obtained after permeation through the membrane comprised 22.9 wt. percent of methane and 77.1 wt. percent of ethylene. These results are substantially similar to the results achieved in Example 1 and indicate that the only requirement for a successful separation is that the mixture contain water vapor and the membrane be hydrophilic.

Example 4

In this example the exact conditions of the preceding example were utilized except that the mixture of methane and ethylene was not saturated with water. The resulting permeation produced a product having the following composition: 57.8% ethylene and 32.2% methane.

From the above it is again demonstrated that the presence of the water vapor serves as an effective carrier for the more soluble element of the mixture since separation was considerably less effective than in Example 3.

Example 5

In this example the exact conditions of Example 1 were repeated except that the temperature maintained in the saturation zone was 32° F., and the temperature in the separation zone was maintained at ambient temperature, 77° F. The amount of water vapor in the feed gas stream was controlled at 13.5% of the saturation value at 77° F. The product after permeation contained 61.5% ethylene and 38.5% methane. The ethylene concentration was lower than that obtained at higher water vapor content as described in Example 1, but still higher than the case where no water vapor was in the feed gas stream as described in Example 2. This again shows the beneficial effect of water vapor on the separation of ethylene from methane even at lower vapor levels.

Example 6

In this example the exact conditions of Example 1 were repeated except that a hydrophobic membrane was used. The membrane used in this example was polyethylene with a density of 0.9288 gm./cc. and a crystalline content of 55%. The product obtained had a composition of 69% ethylene and 31% methane.

Example 7

In this example the exact conditions of the preceding example, Example 6, were utilized except that the mixture of methane and ethylene was not in contact with water before going into the separation zone. The resulting permeation product had a composition of 68.5% ethylene and 31.5% methane. These results indicate the small or negligible effect of water vapor on separation with hydrophobic membrane since the results were almost indentical to the preceding example where water vapor was utilized.

What is claimed is:

1. A process for separating elements of a gaseous mixture; in the presence of a vaporized liquid, said mixture having at least one element which is more soluble in said liquid than at least one other element, which comprises intimately commingling said mixture with said vaporized liquid so that said gaseous mixture contains at least about 13.5% of the amount of vapor required to saturate said gaseous mixture, passing said vapor containing gaseous mixture into a separation zone, said zone containing a semi-permeable membrane having an attraction for said liquid, contacting said vapor-containing gaseous mixture with said membrane under permeation conditions wherein the permeation rate of said more soluble element of said mixture is enhanced and recovering from the separation zone a product enriched in said more soluble element.

2. The process of claim 1 wherein said vaporizable liquid is water and said membrane is hydrophilic.

3. The process of claim 1 wherein said temperature within the separation zone is 75–160° F.

4. The process of claim 2 wherein said mixture contains at least one hydrocarbon.

5. The process of claim 2 wherein said water is present in the amount of about 100%.

6. The process of claim 2 wherein said mixture is natural gas.

7. The process of claim 2 wherein said mixture comprises $NH_3$, $N_2$ and $H_2$.

8. A process for separating elements of a gaseous mixture in the presence of water vapor, said mixture having at least one element which is more soluble in water than at least one other element, which comprises intimately commingling said mixture with water vapor so that said gaseous mixture contains at least about 13.5% of the amount of vapor required to saturate said gaseous mixture, passing said vapor-containing gaseous mixture into a separation zone, said zone containing a hydrophilic membrane, contacting said vapor containing gaseous mixture with said membrane under permeation conditions wherein the permeation rate of the more soluble element of said mixture is enhanced and recovering a product enriched in said more soluble element.

9. The process of claim 8 wherein said mixture contains at least one hydrocarbon.

10. The process of claim 8 wherein said mixture is natural gas.

11. The process of claim 8 wherein said mixture is contacted with said membrane at a temperature of 75° F. to 160° F.

12. The process of claim 8 wherein said mixture comprises olefins and paraffins.

13. The process of claim 8 wherein said membrane is cellulose acetate.

14. The process of claim 8 wherein said membrane is polyethylene glycol terephthalate.

15. The process of claim 8 wherein said mixture is saturated with water vapor.

References Cited

UNITED STATES PATENTS

| | | | |
|---|---|---|---|
| 3,172,741 | 3/1965 | Jolley | 55—16 |
| 3,335,545 | 8/1967 | Robb et al. | 55—158X |

OTHER REFERENCES

Brubaker, D. W. and Kammermeyer, K., Separation of Gases by Plastic Membranes, in Ind. and Eng. Chem., vol. 46, No. 4, April 1954, p. 733–739.

Norton, F. J., Permeation of Gases Through Solids, in Journal of Applied Physics, vol. 28, No. 1, January 1957, p. 38, 39.

Walters, C. J., Process Natural Gas by Permeation, in Petroleum Refiner, vol. 38, No. 5, May 1959, p. 147–150.

REUBEN FRIEDMAN, Primary Examiner

C. N. HART, Assistant Examiner